(12) United States Patent
Brown

(10) Patent No.: US 8,041,146 B2
(45) Date of Patent: Oct. 18, 2011

(54) DECONVOLUTION FOR THE REDUCTION OF BLURRING INDUCED BY INTERNAL REFLECTIONS

(75) Inventor: Carl S. Brown, Seattle, WA (US)

(73) Assignee: Applied Precision, Inc, Issaquah, WA (US)

( * ) Notice: Subject to any disclaimer, the term of this patent is extended or adjusted under 35 U.S.C. 154(b) by 0 days.

(21) Appl. No.: 12/686,911

(22) Filed: Jan. 13, 2010

(65) Prior Publication Data

US 2010/0177984 A1   Jul. 15, 2010

Related U.S. Application Data

(63) Continuation of application No. 10/742,508, filed on Dec. 19, 2003, now abandoned.

(60) Provisional application No. 60/437,264, filed on Dec. 31, 2002.

(51) Int. Cl.
*G06K 9/40*   (2006.01)
*G06K 9/64*   (2006.01)

(52) U.S. Cl. ....................... 382/279; 382/274

(58) Field of Classification Search .............. 382/274, 382/275, 279; 708/420, 421
See application file for complete search history.

(56) References Cited

U.S. PATENT DOCUMENTS
5,627,320 A * 5/1997 Moore ............................. 73/606

OTHER PUBLICATIONS

Epstein, D.J. The effective thickness in internal reflection spectroscopy, Applied Spectroscopy, vol. 34, No. 2 (1980), pp. 233-235.*

* cited by examiner

*Primary Examiner* — Yubin Hung
(74) *Attorney, Agent, or Firm* — Olympic Patent Works PLLC

(57) ABSTRACT

A system and method of image processing employ mathematical deconvolution to estimate the magnitude and location of a target object within an image. Both the nature of internal reflections and the convolution process by which each internal reflection contributes to blurring of the acquired image data may be measured and modeled. In accordance with mathematical deconvolution techniques, the combined effects of these internal reflections may be reduced to the extend that respective contributions of the target object and each individual reflection may be distinguished and quantified.

16 Claims, 2 Drawing Sheets

DECONVOLUTION FOR THE REDUCTION OF BLURRING INDUCED BY INTERNAL REFLECTIONS

CROSS-REFERENCE TO RELATED APPLICATIONS

The present application is a continuation of application Ser. No. 10/742,508, filed Dec. 19, 2003, now abandoned which claims the benefit of U.S. provisional application Ser. No. 60/437,264, filed Dec. 31, 2002.

FIELD OF THE INVENTION

Aspects of the present invention relate generally to digital image processing techniques, and more particularly to an image processing system and method employing mathematical deconvolution to estimate the respective magnitudes and locations of objects within an image.

DESCRIPTION OF THE RELATED ART

Digital imaging systems have been well described in the art. In general, these systems typically comprise some or all of the following components: a sample support mechanism for supporting a sample or specimen to be imaged; an illumination source providing excitation light to illuminate the sample; an optical train operative to focus an image of the sample and to provide enlargement, magnification, resolution enhancement, and other optical effects; a detector or other imaging apparatus such as a charge-coupled device (CCD) camera or a complementary metal oxide semiconductor (CMOS) sensor device, for example; and a computer system or other control apparatus for acquiring, storing, and displaying the images collected by the detector.

The quality of images collected in a conventional manner by typical systems is often affected by internal reflections associated with the sample support, the optical train, the detector, or some combination of these components. Images of large, bright objects tend to be surrounded by regions of decreased contrast; these peripheral regions generally appear as halos of reduced contrast in the final image. Moreover, individual halos from a number of discrete bright objects may sum to reduce the overall contrast of the image further. Even when anti-reflective coatings and non-parallel optical surfaces are employed in efforts to minimize contrast degradation, these halos may persist. In particular, the halos or contrast reduction attributable to the sample support and the optical coatings of the detector itself may be particularly difficult to eliminate.

Conventional technology is deficient at least to the extent that the quality of acquired images may be degraded by indispensable components of the image system itself, such as the detector and various optical elements as set forth above. What is needed is a system and method to minimize the deleterious effects of internal reflections associated with the sample support, the optical train, and the detector on overall image quality in digital image acquisition and processing applications.

SUMMARY

Embodiments of the present invention overcome the above-mentioned and various other shortcomings of conventional technology, providing a system and method of image processing which employ mathematical deconvolution to estimate the respective magnitudes and locations of objects within an image.

In accordance with one exemplary embodiment, a method comprises: acquiring image data of a target object; modeling the image data to create modeled data; responsive to the modeling, estimating a size and an intensity of an internal reflection in an optical train; and deconvolving the modeled data in accordance with the estimating.

The modeling may comprise mathematically expressing the modeled data as a sum of object data representing the target object and reflection data representing the internal reflection. In that regard, some modeling in accordance with the present disclosure further comprises mathematically expressing the reflection data as a plurality of factors, wherein each of the plurality of factors is associated with a respective internal reflection. The estimating may comprise utilizing a series of cylindrical functions; additionally or alternatively, the estimating may comprise utilizing a series of Bessel functions or Gaussian functions.

One exemplary method may further comprise estimating a magnitude and a location of the target object in accordance with the deconvolving. In some embodiments described herein, the method further comprises estimating a magnitude and a location of the target object using the object data (from the modeling operation, for example) and in accordance with the deconvolving.

The acquiring generally comprises utilizing an imaging apparatus, such as a charge-coupled device or a complementary metal oxide semiconductor sensor device. Additional embodiments further comprise storing final image data in accordance with the deconvolving, displaying final image data in accordance with the deconvolving, or both.

An embodiment of a computer readable medium encoded with data and computer executable instructions for processing image data representing a target object is also contemplated. It will be appreciated that the image data in such embodiments is generally acquired from an imaging system. In embodiments operative in accordance with the present disclosure, the data and instructions cause an apparatus executing the instructions to: model the image data to create modeled data; estimate a size and an intensity of an internal reflection in an optical train of the imaging system using the modeled data; and deconvolve the modeled data using results of the estimating operation.

The computer readable medium may be further encoded with data and computer executable instructions causing an apparatus executing the instructions to express the modeled data mathematically as a sum of object data representing the target object and reflection data representing the internal reflection. As with the method embodiment described above, an apparatus executing the instructions may express the reflection data mathematically as a plurality of factors, wherein each of the plurality of factors is associated with a respective internal reflection.

The computer readable medium may be further encoded with data and computer executable instructions causing an apparatus executing the instructions to perform the estimating operation utilizing a series of cylindrical functions, Bessel functions, Gaussian functions, or some combination thereof.

The computer readable medium may be further encoded with data and computer executable instructions causing an apparatus executing the instructions to estimate a magnitude and a location of the target object using results of the deconvolving operation. Such an estimate may use object data as noted above with reference to the method embodiment.

The computer readable medium may be further encoded with data and computer executable instructions causing an apparatus executing the instructions to store final image data resulting from the deconvolving operation, display final image data resulting from the deconvolving operation, or both.

The foregoing and other aspects of various embodiments of the present invention will be apparent through examination of the following detailed description thereof in conjunction with the accompanying drawings.

DETAILED DESCRIPTION

Aspects of the present invention relate to deconvolving digital images. In operation of a typical imaging system, the individual halos attributable to respective internal reflections become convolved with the true image of the object, inducing an effect that appears as blurring in the image. The convolution process and the nature of these internal reflections may be measured and modeled; the combined effects of the reflections may then be reduced through a process of mathematical deconvolution as set forth in more detail below. Image data processed in accordance with the present disclosure may more accurately represent the actual objects, intensities, and distributions than the original image data acquired by the imaging system.

Figure 1A:
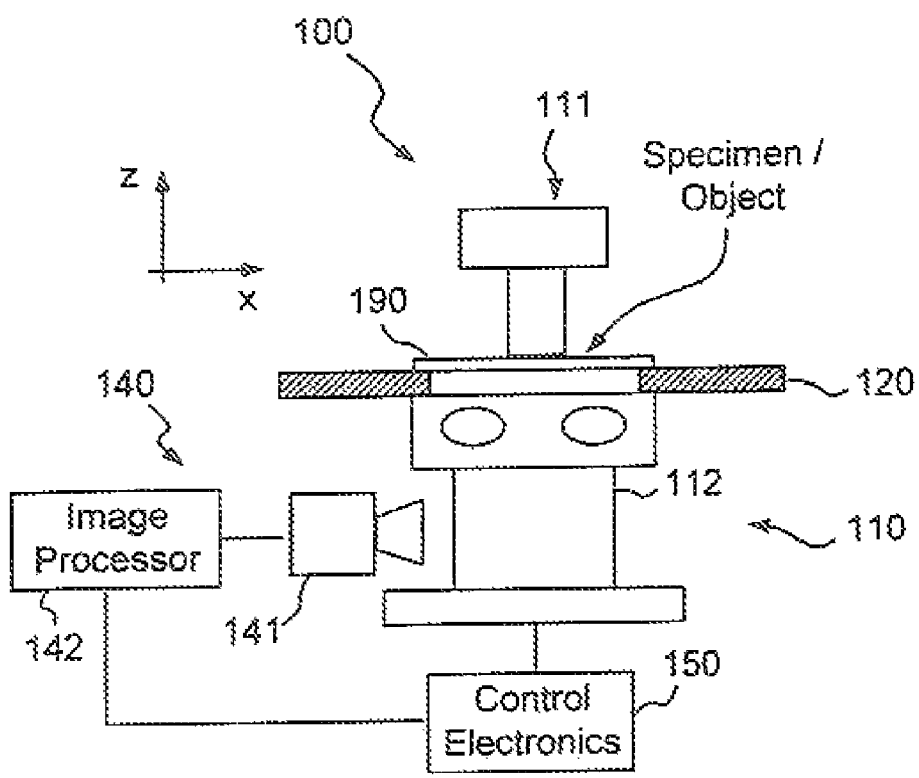
FIG. 1A is a simplified functional block diagram illustrating components of a digital image acquisition and processing system with which embodiments of a mathematical deconvolution method may be employed.
Figure 1B:
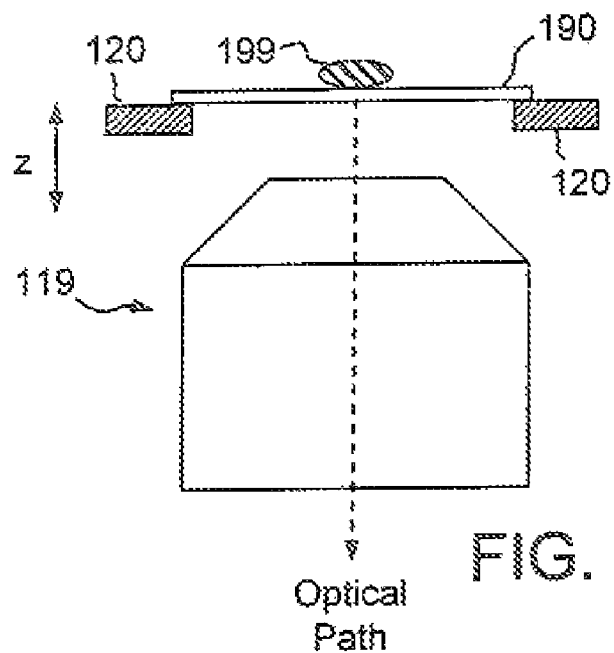
FIG. 1B is a simplified functional block diagram illustrating a portion of the image acquisition and processing system depicted in FIG. 1A.

Turning now to the drawing figures, FIG. 1A is a simplified functional block diagram illustrating components of a digital image acquisition and processing system with which embodiments of a mathematical deconvolution method may be employed, and FIG. 1B is a simplified functional block diagram illustrating a portion of the image acquisition and processing system depicted in FIG. 1A. Those of skill in the art will appreciate that FIGS. 1A and 1B are provided by way of example only, and that the specific arrangement of components is susceptible of numerous modifications; the exemplary scale, orientation, and interrelationship of the various components may be altered in accordance with system requirements. Additionally, as will become apparent from examination of the following description, some or all of the functionality of some components depicted as discrete elements may be combined or incorporated into other components.

As illustrated in FIGS. 1A and 1B, system 100 generally comprises a microscope 110 operably coupled to a sample support mechanism, typically embodied in a precision movable stage 120, and to an image acquisition component 140. Stage 120 may be configured and operative to support a microarray, microscope slide, or other similar structure (reference numeral 190) upon which a specimen or target object 199 to be imaged is disposed. As is generally known in the art, microscope 110 may comprise, or be operative in conjunction with, an illumination source 111 for illuminating state 120, slide 190, or both with light of a predetermined or selected frequency or spectral bandwidth; in that regard, illumination source 111 may provide light in the visible, infrared, or ultraviolet wavelengths.

In some embodiments, illumination source 111 may be incorporated within housing 112 of microscope 110, i.e., on the opposite side of stage 120 and slide 190 than depicted in FIG. 1A. Alternatively, an additional source of illumination (not shown) to be used in conjunction with, or in lieu of, source 111 may be accommodated or maintained in housing 112. In these embodiments, any such illumination source disposed within housing 112 may be suitable dimensioned and positioned neither to interfere with optical components of microscope 110 nor to obstruct the optical path through microscope 110 (to image acquisition component 140).

Stage 120 may be movable relative to optics (e.g., objective 119 illustrated in FIG. 1B) incorporated into microscope 110 (microscope optics are not depicted in FIG. 1A). In some embodiments, stage 120 may be movable in both the x and y directions (where the y axis is normal to the plane of FIG. 1A). Additionally or alternatively, stage 120 may incorporate or comprise one or more structures and mechanisms configured and operative precisely to position slide 190 in the x and y directions relative to the structure of stage 120 itself. In such embodiments, precise two-dimensional positioning (i.e., x and y coordinates) of object 199 relative to the optical path of microscope 110 may be achieved through movement of stage 120 relative to microscope optics, movement of slide 190 relative to stage 120, or both.

In some embodiments, stage 120 may also be movable along the z axis (the optical axis). It will be appreciated that microscope optics may also facilitate positioning an object on slide 190 in the proper location in three-dimensional space (i.e., x, y, and z coordinates) relative to the optical path and the focal point of objective 119. In that regard, one or more optical components of microscope 110 such as objective 119 may be movable in the z direction, either in addition to, or as an alternative to, selectively moving stage 120 along the optical axis. Additionally or alternatively, objective 119 may be movable along the x axis, the y axis, or both.

It will be appreciated that numerous mechanism and methods of positioning object 199 to be imaged relative to microscope optics are generally known. Relative movement of various components (such as slide 190, stage 120, and objective 119, for example), either individually or in combination, may vary in accordance with system requirements and configuration, and may be effectuated to position object 199 in a suitable location relative to objective 119. The present disclosure is not intended to be limited by the structures and processes employed to position object 199 relative to objective 119 and the optical path.

Microscope optics may generally be configured and operative in conjunction with image acquisition component 140; in that regard, component 140 generally comprises a camera, a charge-coupled device (CCD) sensor apparatus, a complementary metal oxide semiconductor (CMOS) sensor device, or other detector 141 operably coupled to an image processor 142 or other appropriate electronics. System 100 may additionally include control electronics 150 operative to control, for example: operational parameters, functional characteristics, or other configurable aspects of image processor 142 and detector 141; two- or three-dimensional motion of stage 120, objective 119, or other components; power output, spectral bandwidth, frequencies, or other operational parameters of source 111 and any other illumination source; data storage; and the like. In that regard, electronics 150 may comprise one or more microprocessors, microcontrollers, or other programmable devices capable of executing computer readable instructions; additionally, electronics 150 may also comprise or be operably coupled with data storage media. Those of skill in the art will appreciate that various methods and apparatus employing microprocessors or computer executable instruction sets to configure and to control operation of image acquisition systems are generally known.

During operation of system 100, image data acquired by detector 141 may be summed, manipulated, saved, or otherwise processed by hardware, software, or both resident at image processor 142; in some embodiments, functionality of processor 142 may be influenced or controlled by signals transmitted from electronics 150 as noted above. Alternatively, the functionality of image processor 142 and electronics 150 may be incorporated into a single device, for example. Specifically, image processor 142 may be operative in accordance with instruction sets to compute solutions or approximations for the equations set forth below.

The image collected by an optical system (e.g., such as detector 141 and image processor 142 in FIG. 1A) may be described as a combination of image data representing the actual target object plus image data representing the combined effects of individual internal reflections attributable to various system components. Each internal reflection, in turn, may be described as a cylindrical step function of some magnitude and width. This may be described mathematically as follows:

$$I_{image} = \Theta_{object} + \Theta_{object} \otimes P_a \Pi_a\left(\frac{r}{2a}\right) + \Theta_{object} \otimes P_b \Pi_b\left(\frac{r}{2b}\right) + \ldots \Theta_{object} \otimes P_x \Pi_x\left(\frac{r}{2x}\right) \quad \text{(Eq. 1)}$$

As set forth in Equation 1 above, the image ($I_{image}$) may be formed by summing the contribution of the target object ($\Theta_{object}$) and contributions of that target object convolved ⊗ with a series of cylindrical functions ($\Pi_x$) having a peak height of $P_x$ and a width of 2x, where x is the radius and r is the distance from the center of $\Pi_x$. The peak of each of these functions may be determined or influenced by the magnitude of the respective internal reflection each function represents; the width may be defined or influenced by the location of the respective internal reflection within the optical train, as well as by the overall magnification of the optical trains.

Solving for $\Theta$ and omitting scaling factors, $P_x$, produces $$I = \Theta + \Theta \otimes [\Pi_a + \Pi_b + \ldots \Pi_x] \quad \text{(Eq. 2)}$$

Solving for the original target object ($\Theta_{object}$) yields $$\Theta = I - \Theta \otimes [\Pi_a + \Pi_b + \ldots \Pi_x] \quad \text{(Eq. 3)}$$

Taking the Fourier Transform of both sides of Equation 3 yields the following:

$$F[\Theta] = F\{I - \Theta \otimes [\Pi_a + \Pi_b + \ldots \Pi_x]\} = F[I] - F[\Theta]F[\Pi_a + \Pi_b + \ldots \Pi_x] \quad \text{(Eq. 4)}$$

Solving for F[I]:

$$F[I] = F[\Theta] + F[\Theta]F[\Pi_a + \Pi_b + \ldots \Pi_x] \quad \text{(Eq. 5)}$$

Solving now for F[Θ]:

$$F[\Theta] = \frac{F[I]}{1 + F[\Pi_a + \Pi_b + \ldots \Pi_x]} \quad \text{(Eq. 6)}$$

Inverse Fourier Transformation yields Equation 7 as set forth below:

$$\Theta = F^{-1}\left\{\frac{F[I]}{1 + F[\Pi_a + \Pi_b + \ldots \Pi_x]}\right\} \quad \text{(Eq. 7)}$$

From Integral Tables published in the art, the Fournier transform of $\Pi_x$ may be expressed as follows:

$$F\left[\Pi\left(\frac{r}{2a}\right)\right] = \frac{aJ_1(2\pi aq)}{q} \quad \text{(Eq. 8)}$$

where $J_1$ is a first order Bessel Function and q is spatial frequency. Expanding, now, for the solution to $\Theta$ and including scaling factors, $P_x$:

$$\Theta = F^{-1}\left\{\frac{F[I]}{1 + P_a\left[\frac{aJ_1(2\pi aq)}{q}\right] + P_b\left[\frac{bJ_1(2\pi bq)}{q}\right] + \ldots P_x\left[\frac{xJ_1(2\pi xq)}{q}\right]}\right\} \quad \text{(Eq. 9)}$$

Optical modeling software and empirical measurements may be used to solve for the magnitude and size of the contribution from each optical interface. these contributions can then be used to solve for $\Theta$ using the Fourier method set forth above.

Figure 2:
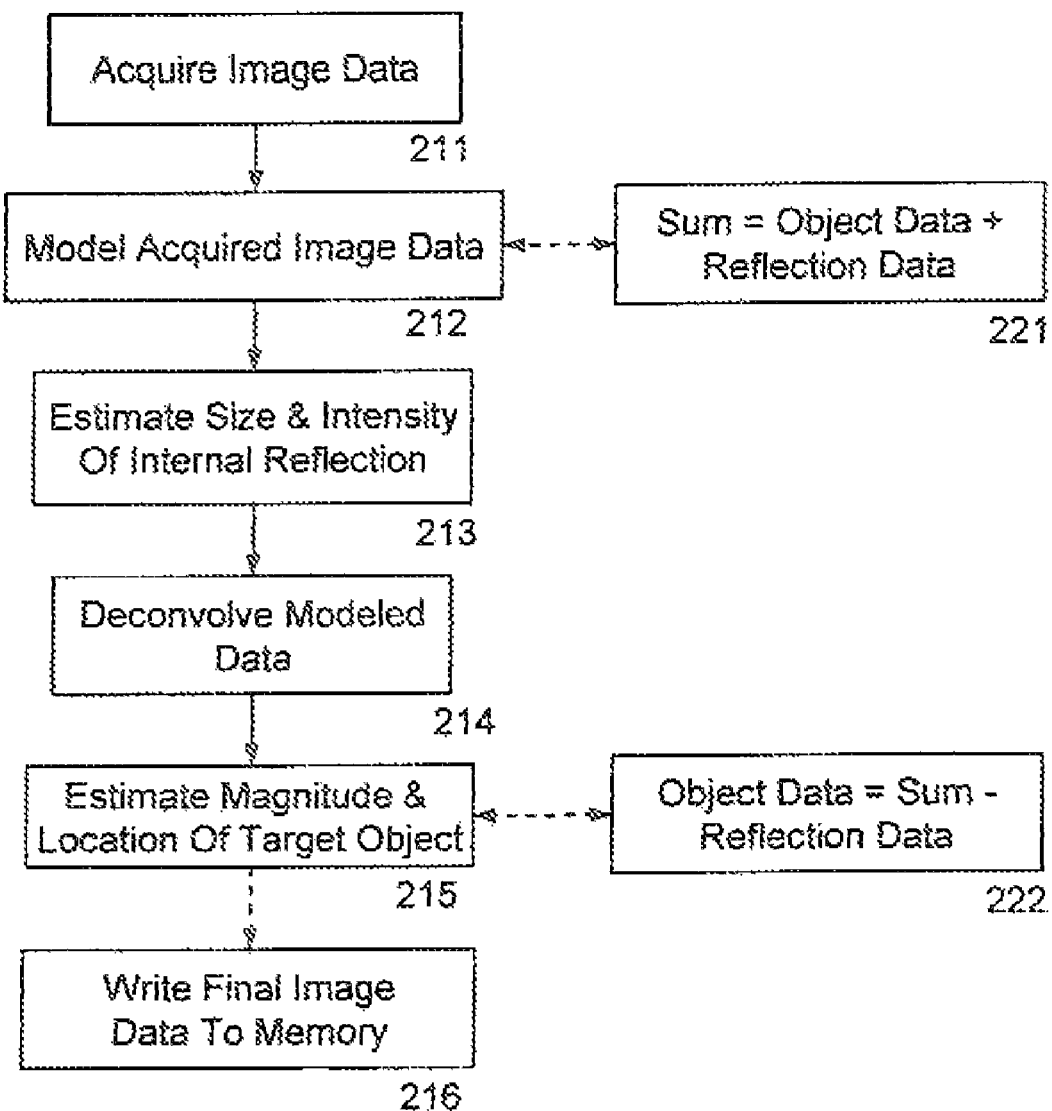
FIG. 2 is a simplified flow diagram illustrating the general operation of one embodiment of an image processing method employing mathematical deconvolution.

FIG. 2 is a simplified flow diagram illustrating the general operation of one embodiment of an image processing method employing mathematical deconvolution. As indicated at block 211, an exemplary image processing method may acquire image data of an appropriately illuminated target object. The acquiring operation depicted at block 211 may comprise utilization of an embodiment of an image acquisition system such as set forth in detail above with reference to FIGS. 1A and 1B. In some implementations, microscope optics may be configured and operative in conjunction with an image acquisition component such as a camera, a CCD or CMOS sensor device, or other detector operably coupled to an image processor or other appropriate electronics. It will be appreciated that such image acquisition systems may be susceptible of numerous alternations, and that neither the present disclosure, in general, nor the acquiring operation at block 211 in FIG. 2, in particular, is intended to be limited by the specific components and functional characteristics of any particular image acquisition system.

Acquired image data may be modeled (to create "modeled data") as indicated at block 212. As set forth above, the image collected by an optical system (e.g., the "image data" acquired at block 211) may be described as a combination of data representing the actual target object plus data representing individual internal reflections attributable to various system components. In that regard, one embodiment of the modeling at block 212 may generally comprise mathematically expressing "modeled data" as a sum of "object data," which represents the contribution of the target object, and "reflection data," which represents the contribution of an internal reflection. This mathematical summation approach to the modeling operation 212 is represented at block 221 in FIG. 2.

As set forth in Equation 1 and described above, exemplary modeling at block 212 may consider the contribution of the target object ($\Theta_{object}$) and contributions of that target object convolved ⊗ with a series of cylindrical functions ($\Pi_x$). It will be appreciated, however, that various other functions (i.e., not cylindrical step functions) may be used in lieu of, or in addition to, $\Pi_x$ in Equation 1 or in other modeling strategies. For example, Gaussian or Bessel type functions may also be used to model the internal reflections.

Responsive to the modeling at block 212 (and, depending on the embodiment, the summing at block 221), a size and an intensity of an internal reflection in an optical train of the imaging system may be estimated as indicated at block 213. As set forth above, such internal reflections may be attributable to mechanical components (such as the stage or sample support apparatus) and optical components (such as the imaging device or optics) of the image acquisition system. Additionally, more than one internal reflection may contribute to the halo effect that causes blurring as described above. Accordingly, the modeling (block 212), summing (block 221), and estimating (block 213) may account for multiple internal reflections. In some such embodiments, for example, the modeling operation at block 212 may further comprise mathematically expressing the reflection data as a plurality of factors, each of which may be associated with a respective internal reflection. The plurality of factors may be summed at block 221 and estimated at block 213 to account for the contribution of each respective internal reflection in creation of the modeled data.

In accordance with some embodiments, a table, array, or other data structure may be implemented to store specific reflection parameters (e.g., such as $P_x$ and x in Equation 1) for a particular configuration of optical components. The number and nature of such stored parameters may be influenced by the type of functions (e.g., such as $\Pi_x$ in Equation 1) used to model the internal reflections. If specific values for appropriate parameters are maintained in a fixed or static data structure accessible, for example, by deconvolution software or other computer executable instruction sets, the modeling operation at block 212 and the estimating operation at block 213 (as these relate to internal reflections attributable to components of the imaging system) may be performed only when particular optical components of the imaging system are changed or modified.

Modeled data may be deconvolved as indicated at block 214. From the foregoing detailed description, it will be appreciated that the deconvolution of modeled data at block 214 may be performed in accordance with the estimating at block 213. In that regard, some embodiments of the estimating at block 213 may comprise utilizing or implementing a series of cylindrical functions such as described above with reference to Equation 1. Deconvolving at block 214 may distinguish and quantify contributions (to the acquired "image data") attributable to the target object from contributions attributable to one or more internal reflections.

Specifically, as indicated at block 215, the magnitude and location of the target object may be estimated in accordance with the deconvolving at block 214. As noted above, such estimating at block 215 may comprise using the "object data" (i.e., a subset of the acquired "image data") identified at blocks 212 and 221.

As indicated at block 216, the exemplary image processing method of FIG. 2 may further comprise storing "final image data," such as by writing these data to a memory device. Examples of suitable storage devices include a digital versatile disk (DVD) or compact disk (CD) drive apparatus, for example; other types of media and electronic hardware devices for storing data are generally known in the art. Additionally or alternatively, final image data may be sent to a monitor (e.g., a liquid crystal display (LCD) or cathode ray tube (CRT) display), transmitted via network connection to one or more computer terminals or servers, or both.

The "final image data" referenced in block 216 may be created in accordance with the deconvolving at block 214 and the estimating at block 215. Specifically, in accordance with the FIG. 2 embodiment, both the nature of the internal reflections and the convolution process by which each internal reflection contributes to blurring of the acquired image data may be measured and modeled. In accordance with the deconvolving (block 214) and estimating (block 215), the combined effects of these internal reflections may be reduced in the final image data written, saved, displayed, or some combination thereof (block 216) to the extent that respective contributions of the target object and each individual reflection may be distinguished and quantified. Accordingly, object data and reflection data contributing to the final image data may be expressed as constituent parts, as indicated at block 222.

Various alternatives exist with respect to the FIG. 2 embodiment, and the presented order of the individual blocks is not intended to imply a specific sequence of operations to the exclusion of other possibilities. Specifically, the particular application and overall system requirements may dictate the most efficient or desirable sequence of the operations set forth in FIG. 2. Individual operations depicted at discrete blocks (such as, for example, the modeling and summing at blocks 212 and 221) may be integrated or combined, for example, where appropriate mathematical operations, computer software routines, or both, are to be implemented.

Though not limited with respect to particular context and implementations, the foregoing embodiments or modified versions thereof may have specific utility in conjunction with strategies or techniques for imaging biomedical samples or specimens. By way of example, such techniques include methods of acquiring and processing two-dimensional images of biochips, microarrays, and histological specimens. Additionally or alternatively, the foregoing functionality may be employed in conjunction with methods of acquiring and processing individual two-dimensional images of multi-dimensional series of images acquired, for example, across different axial locations, different colors or wavelengths, different successive time points, and different imaging modalities. The foregoing list is not intended to be exhaustive; other practical applications of mathematical deconvolution as set forth herein are contemplated.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

The invention claimed is:
1. A method comprising:
acquiring image data of a target object;
modeling said image data to create modeled data;
responsive to said modeling, estimating a size and an magnitude of an internal reflection in an optical train; and
deconvolving said modeled data in accordance with said estimating.
2. The method of claim 1 wherein said modeling comprises mathematically expressing said modeled data as a sum of object data representing said target object and reflection data representing said internal reflection.

3. The method of claim 2 wherein said modeling further comprises mathematically expressing said reflection data as a plurality of factors, wherein each of said plurality of factors is associated with a respective internal reflection.

4. The method of claim 1 wherein said modeling comprises utilizing a series of cylindrical functions.

5. The method of claim 1 wherein said acquiring comprises utilizing a charge-coupled device.

6. The method of claim 1 wherein said acquiring comprises utilizing a complementary metal oxide semiconductor sensor device.

7. The method of claim 1 further comprising storing final image data in accordance with said deconvolving.

8. The method of claim 1 further comprising displaying final image data in accordance with said deconvolving.

9. The method of claim 1, wherein the target object is mounted on a stage that is movable relative to the optical train.

10. A computer readable medium encoded with data and computer executable instructions for processing image data representing a target object; said image data acquired from an imaging system; the data and instructions causing an apparatus executing the instructions to:
  model said image data to create modeled data;
  estimate a size and an magnitude of an internal reflection in an optical train of said imaging system using said modeled data; and
  deconvolve said modeled data using results of the estimating operation.

11. The computer readable medium of claim 10 further encoded with data and computer executable instructions; the data and instructions further causing an apparatus executing the instructions to express said modeled data mathematically as a sum of object data representing said target object and reflection data representing said internal reflection.

12. The computer readable medium of claim 11 further encoded with data and computer executable instructions; the data and instructions further causing an apparatus executing the instructions to express said reflection data mathematically as a plurality of factors, wherein each of said plurality of factors is associated with a respective internal reflection.

13. The computer readable medium of claim 10 further encoded with data and computer executable instructions; the data and instructions further causing an apparatus executing the instructions to perform said modeling operation utilizing a series of cylindrical functions.

14. The computer readable medium of claim 10 further encoded with data and computer executable instructions; the data and instructions further causing an apparatus executing the instructions to store final image data resulting from the deconvolving operation.

15. The computer readable medium of claim 10 further encoded with data and computer executable instructions; the data and instructions further causing an apparatus executing the instructions to display final image data resulting from the deconvolving operations.

16. The computer readable medium of claim 10, wherein the target object is mounted on a stage that is movable relative to the optical train.

* * * * *